United States Patent [19]

Hall et al.

[11] Patent Number: 5,162,453

[45] Date of Patent: Nov. 10, 1992

[54] DYE SUBSTITUTED POLYMERS CONTAINING HYDROPHOBICALLY TERMINATED STILBAZOLIUM RADICALS

[75] Inventors: Robert C. Hall, Placerville; Geoffry A. Lindsay; James M. Hoover, both of Ridgecrest, all of Calif.

[73] Assignee: The United States of America as represented by the Secretary of the Navy, Washington, D.C.

[21] Appl. No.: 619,773

[22] Filed: Nov. 29, 1990

Related U.S. Application Data

[63] Continuation-in-part of Ser. No. 302,496, Jan. 27, 1989, abandoned.

[51] Int. Cl.$^5$ .......................................... C08F 283/06
[52] U.S. Cl. .................................. 525/404; 525/405; 525/406; 525/417; 525/426; 525/427; 525/428; 525/429; 528/417

[58] Field of Search ............... 525/404, 405, 406, 417, 525/426, 427, 428, 429; 528/417

[56] References Cited

U.S. PATENT DOCUMENTS 4,818,616  4/1989  Milverton et al. .................. 525/376

*Primary Examiner*—John Kight, III
*Assistant Examiner*—Frederick Krass
*Attorney, Agent, or Firm*—Stuart H. Nissim; Donald E. Lincoln; John L. Forrest

[57] ABSTRACT

Comb-shaped polymers, comprised of hydrophilic backbones and dye-containing, hydrophobic side chains are synthesized for use in multilayered, noncentrosymmetric, thin films by means of Langmuir-Blodgett processing techniques. The second harmonic signal generation exhibited by these films increases quadratically with the number of layers of polymeric dye in the film.

6 Claims, 1 Drawing Sheet

DYE SUBSTITUTED POLYMERS CONTAINING HYDROPHOBICALLY TERMINATED STILBAZOLIUM RADICALS

This is a continuation-in-part of Ser. No. 07/302,496 filed on Jan. 27, 1989, now abandoned.

BACKGROUND AND SUMMARY OF THE INVENTION

Field of the Invention

This invention relates to thin film polymeric dye compositions and more particularly to such compositions prepared for nonlinear optical properties by means of the Langmuir-Blodgett process.

The field of nonlinear optics is concerned with the interactions of electromagnetic fields in various media, such as thin polymeric films, to produce new fields altered in phase, frequency, amplitude, or other propagation characteristics from the incident field. See, for example: Y. R. Shen, "The Principles of Nonlinear Optics", John Wiley & Sons, N.Y., 1984. The best known nonlinear effect is second harmonic generation (SHG) or laser frequency doubling. Optical nonlinearity is useful for doubling the frequency of lasers, electro-optical switches, modulators, interconnect devices, other optical devices and laser resistant surfaces.

Here-to-fore, nonlinear optical devices, such as laser frequency doublers, have been based exclusively on crystalline inorganic materials, such as lithium niobate and potassium dihydrogen phosphate. Disadvantages of these inorganic materials include slow response times to optical signals, poor laser damage resistance, and small optical nonlinearities. Additionally, these inorganic materials are difficult to prepare and process into microelectronic devices. Nonpolymeric organic materials, on the other hand are limited by poor mechanical properties and the difficulty of growing large, high quality single crystals. Organic nonlinear optical devices are described in: A. F. Garito and K. D. Singer, Laser Focus, 18, 59 (1982); D. J. Williams, ed., Am. Chem. Soc. Symposium Series 233 (1983); and D. J. Williams, Angew. Chem. Intl., 23, 690 (1984); G. T. Boyd, J. Opt. Soc. Am. B, 6(4) 685 (1989), "Applications requirements for nonlinear-optical devices and the status of organic material."

It has been found that organic polymeric materials with large delocalized pi electron systems (called dyes or chromophores) exhibit large molecular hyperpolarizabilities, which translate into large second order nonlinear optical responses when the dipole moments of dye groups are aligned, on the average, in the same direction. Polymeric materials have good mechanical properties, are easily processed, and can have thin-film geometries desirable for coatings and integration with microelectronics. It is important to note that piezoelectric and pyroelectric properties are also potentially exhibited by these films. These properties are useful in pressure and temperature sensors, respectively.

There are many techniques for depositing thin polymer films including adsorption from solutions (see L. R. Netzger and J. Sagiv, Thin Solid Films, 132, 153 (1985), and B. Vincent and S. G. Whittington, Surf. and Colloid Sci., 12, 12 (1982)); plasma deposition (see H. Yasuda, J. Polym. Sci.: Macromolecules Rev., 16, 199 (1981)); electrodeposition (see B. K. Garg, et al., AIChE J., 22, 65 (1978)); and simply casting from solution. Although some surface order may exist in polymer films made by these techniques, none have yet been able to induce persistent order in three dimensions. Electric-field poling of these films while in a liquid state then cooling to the glassy state can form polarized polymer films. (See C. Ye, et al., Mat. Res. Soc. Symp. Proceedings, 109, 263 (1988); K. D. Singer, M. G. Kuzyk, W. R. Holland, J. E. Sohn, S. L. Lalama, R. B. Comizzoli, H. E. Katz and M. L. Schilling, Appl. Phys. Lett., 53(19), 1800 (1988); M. A. Mortazavi, A. Knoesen, S. T. Kowel, B. G. Higgins, and A. Dienes, J. Opt. Soc. Am. B, 6(4), 733 (1989), "Second-harmonic generation and absorption studies of polymer-dye films oriented by corona-onset poling at elevated temperatures."). However, there are many hazards and disadvantages in working with the large voltages required, such as dielectric breakdown and subsequent destruction of the film. Furthermore, films processed by electric field poling must not contain any mobile ionic species in order to avoid dielectric breakdown.

Another approach to preparation of thin polymer films is the Langmuir Blodgett deposition technique (see I. Langmuir and K. B. Blodgett, Kolloid-Zeitschrift, 73, 257 (1935)) which involves depositing a solution of nonvolatile, amphophilic material in volatile solvent onto the surface of highly purified water, evaporation of the solvent, leaving an ultra thin film (ca. 2 to 3 nm thick) of the amphophilic material on the water subphase, compressing the film with a partially submerged, movable barrier or dam, holding the film at a constant degree of compression or surface tension by means of a computer-controlled film balance, and dipping a solid substrate vertically or horizontally into and out of the film-water interface which coats the solid substrate with the amphophilic film material (see G. L. Gains, Jr., "Insoluble Monolayers at Liquid-Gas Interfaces", Wiley-Intersciences, New York, 1966.). Langmuir-Blodgett film balances or troughs are commercially available from many suppliers. Research in this area is published every year or two from the International Conferences on Langmuir-Blodgett Films (See Thin Sold Films, Elsevier Sequoia, S. A., Lausanne, Switzerland, e.g., most recently in volume 178, May 1989).

Reports on the fabrication of multi-layered Langmuir-Blodgett films comprised of non-polymeric amphophilic dye molecules are presented in: L. M. Blinov, et al., Sov. Phys. Solid State 24, 1523 (1982); M. F. Daniel and G. W. Smith, Mol. Cryst. & Liq. Cryst. 102, 193 (1984); I. R. Girling, et al., Thin Solid Films, 132, 101 (1985); Th. Rasing, G. Berkovi, Y. R. Shen, S. G. Grubb and M. W. Kim, Chemical Physics Letters, 130(1,2), 1 (1986); H. Nakanishi, et al., Japanese J. of Applied Physics, 26(10), 1622 (1987); M. Era, et al., Japanese J. of Applied Physics, 26(11), L1809 (1987): L. M. Hayden, S. T. Kowel and M. P. Srinivasan, Opt. Comm., 61(5), 351 (1987): J. S. Schildkraut, et al., Optics Letters, 13(2), 134 (1988); D. Lupo, H. Ringsdorf, et al., J. Opt. Soc. Am. B, 5(2), 300 (1988). However, we have found that attaching the dyes to polymers makes the films more robust and more able to retain a thickness-dependent quadratic enhancement of second harmonic generation (SHG) than can monomeric amphophilic dyes.

A number of laboratories have been working independently on attaching dyes to polymers for nonlinear optical applications. However, the polymeric dyes created so far are not suitable for Langmuir-Blodgett deposition, but rather are formulations suitable only for electric field poling of spun-cast films. See for example: P. LeBarny, et al., Proceedings of the SPIE, 682, 56 (1987); T. J. Marks, et al., Material Research Society Symposium Proceedings, 109, 263 (1987); A. C. Griffin, et al., ibid., p. 115; R. DeMartino, et al., ibid, p. 65; D. R. Robello, J. Polym. Sci: Part A: Polym. Chem. 28, 1, (1990). The criteria for selecting polymers are quite different for Langmuir-Blodgett deposition than for the electric field poling process described in these references. For example, ionic charges should be absent for best results in electric field poling because the ions tend to migrate in large electric fields leading to dielectric breakdown of the organic film. For Langmuir-Blodgett deposition, on the other hand, ions in the polymeric dyes impart necessary hydrophilicity and desirably large optical nonlinearity. However, care must be exercised to have the proper balance of hydrophilicity and hydrophobicity.

Mixtures of dyes and polymers (so called guest-host systems) in Langmuir-Blodgett films which exhibit second-order nonlinearity are known in the prior art. See P. Stroeve, et al., Thin Solid Films, 146, 209 (1987), and S. T. Kowel, et al., Opt. Eng., 26(2), 107 (1987). However, these physical mixtures do not give quadratic enhancement of second harmonic generation, and the dye molecules diffuse over long periods of time causing the nonlinearity to decrease.

Work on polymeric dyes designed for Langmuir-Blodgett fabrication into nonlinear optical films and which demonstrated quadratic enhancement of optical nonlinearity as a function of film thickness was reported by the present inventors in: R. C. Hall, et al., SPIE Proceedings, 824, 121 (1987), and R. C. Hall, et al., Materials Research Society Proceedings, 109, 351 (1988). These papers are incorporated by reference herein.

Related publications are: N. Carr, et al., Makromol. Chem., Rapid Commun. 8, 493 (1987), and R. H. Tredgold, et al., Electronics Letters, 24(6), 308 (1988). The Carr paper describes chemically attaching an azo group to a poly(dimethyl siloxane) and measuring second harmonic generation from a single monolayer. Their composition contained a hydrophobic backbone and a weak dipole moment. They report the futility of making multilayered, noncentrosymmetric films by the Langmuir-Blodgett technique, and hence reported results on only on monolayer of polymer. The Tredgold paper describes interleaving a comb-polymer containing a weak dipole moment with a small molecule containing a large dipole moment. They encountered great difficulties in efforts to form thick Langmuir-Blodgett films of alternating layers of two distinct polymers. They did not observe quadratic enhancement of the second harmonic with thickness of their films.

Thus the prior art describes arrangements of nonpolymeric dyes into fragile, thin films which exhibit optical nonlinearity which increases only linearly with thickness beyond a few layers of thickness, or which rearrange with time to give little or no optical nonlinearity. Additionally, the prior art discloses mixtures of polymers and dyes arranged into nonstable films whose optical nonlinearity increases less than quadratically with thickness and whose nonlinearity also decreases with time. These polymer-dye compositions cannot be fabricated into a multilayer film with the necessary optical properties and characteristics.

It is an object of the present invention to provide novel comb-shaped polymers comprised of chemically attached dyes specifically designed for Langmuir-Blodgett thin film processing.

It is a further object of the present invention to provide novel comb-shape polymers capable of providing noncentrosymmetric films having large second order optical nonlinearity.

It is a further object of the present invention to provide novel comb-shaped polymers capable of providing optically nonlinear polymer films having fast response time to optical signals and good mechanical properties and resistance to laser damage.

It is another object of the present invention to provide novel comb-shaped polymers capable of providing polarized polymer films maximizing dye group concentration and the nonlinear optical effect, and minimizing optical losses and any time dependent relaxation of the noncentrosymmetric molecular dipole orientation.

It is yet another object of the present invention to provide novel comb-shaped polymers capable of providing optically nonlinear films easily prepared and fabricated in thin film geometries for coatings and other formats for use in optical devices.

It is yet another object of the present invention to provide novel comb-shaped polymers capable of providing polarized polymer films fabricated by the Langmuir-Blodgett technique.

It is yet another object of the present invention to provide novel comb-shaped polymers capable of providing polarized polymer films which produce a quadratic enhancement of second harmonic generation as a function of number of monolayers (thickness).

It is yet another object of the present invention to provide novel comb-shaped polymers capable of providing a multilayered, optically nonlinear, polymer film.

It is yet another object of the present invention to provide novel comb-shaped polymers capable of providing pyroelectric polymer film.

It is finally another object of the present invention to provide novel comb-shaped polymers capable of providing a piezoelectric polymer film.

SUMMARY OF THE INVENTION

The claimed invention is a new class of polymeric dyes together with robust, polarized thin films of these polymers that are fabricated by the Langmuir-Blodgett process, and which exhibit large optical nonlinearity that increases quadratically as the thickness of the film increases. The polymers of the present invention overcome the above described problems by providing the proper hydrophilic/hydrophobic balance, and a glassy polymeric environment which locks the alignment of the dyes or chromophores in place, provided the films are used below their glass transition temperature. Furthermore, since the dye or chromophore is chemically attached to the polymer, it has even less freedom of movement than a simple mixture of dye and polymer. Furthermore, the polymer films may be crosslinked restricting the freedom of movement even more.

These polymeric dyes or chromophores, fabricated into stacks of monomolecular layers via Langmuir-Blodgett processing, exhibit an optical nonlinearity, as indicated by the generation of a laser beam of doubled frequency relative to the fundamental frequency of a primary laser beam transmitted through the film. The increase in amplitude of the second harmonic light increases with the square of the thickness of the film. This is called quadratic enhancement. These thin films comprised of polymeric dyes are tough and rugged, and thus, they are difficult to remove from the substrate on which they are deposited relative to non-polymeric Langmuir-Blodgett films. These polymeric dyes can be interleaved with common fatty acids, fatty acid salts, or optically linear polymers to further enhance their physical, optical or electrical properties.

According to the present invention, comb-shaped polymers are provided comprising: 1) a hydrophilic polymer backbone, 2) orientable, pendent chromophores or dyes, and 3) hydrophobic groups (tails) attached to the end of the dye molecule opposite to the end of the dye which is attached to the polymer backbone, so that when a film of this polymer is placed on the water subphase surface of a Langmuir-Blodgett (LB) trough, the dye groups align normal to the water surface due to repulsion of hydrophilic and hydrophobic groups. When this polymer film is compressed, a highly organized, noncentrosymmetric monolayer is formed. Furthermore, the hydrophobic tails on the dye group may contain polymerizable groups so that the polymer film may be cross-linked by photo, radiative or thermal techniques. This cross linking reaction may be carried out before or after the monolayer is transferred to a solid substrate. Multi-layer films may be obtained by successive transfers to produce thicker polymer films having nonlinear optical properties.

Multilayered Langmuir-Blodgett films from the same polymer can be formed in several different geometries, called the "X", "Y" and "Z" types. The Z and X-type of films, because they are head-to-tail or tail-to-head, are noncentrosymmetric. The Y-type films are centrosymmetric because they are formed head-to-head/tail-to-tail. The following diagram shows each type:

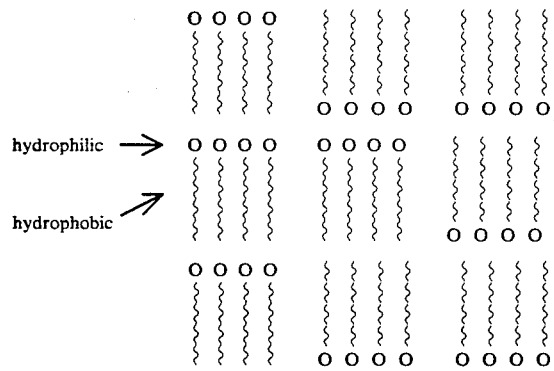

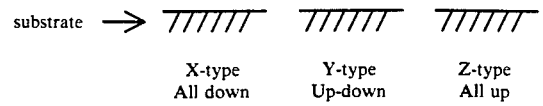

The Y-type films are more thermodynamically stable than the X- and Z-types, which have been known to rearrange to the Y-type upon aging.

Depending on the particular device or dipping strategy, one may desire that the dipole moment of the pendent dye groups point towards the polymer backbone, or away from it. In either case the final film must have a net dipole moment pointing in the same direction in order to exhibit second order nonlinearity. However, a film formed by the preferred dipping strategy, up-down or "y"-type deposition (see the Gains reference above), would be centrosymmetric if the same polymeric dye were used for each layer. This is because for up-down deposition, the hydrophilic side of any layer contacts the hydrophilic side of an adjacent layer and the hydrophobic side contacts the hydrophobic side of the other adjacent layer (which gives the most thermodynamically stable films). To remedy this situation for up-down dipping, one must deposit alternately a layer of polymer containing a large oriented dipole and a layer containing little or no dipole moment; or alternatively, deposit alternating (AB) layers of polymers in which polymer A has its dipole moment pointing in one sense, e.g., towards its main chain backbone, and polymer B has its dipole moment pointing in the opposite sense, e.g., away from the main chain backbone.

Only noncentrosymmetric films can generate appreciable second harmonic radiation. Hence, multilayered films for the present invention can be comprised of (AF) or (BF) Y-type bilayer where A and B are polymer-bound dye layers and F is a fatty acid, fatty acid salt or polymer spacer layers. Fatty acid salts may be selected from calcium behenate, calcium arachidate, cadmium behenate, cadmium arachidate and related fatty salts. Polymer spacer layers may be selected from poly(methyl methacrylate), poly(isopropyl methacrylate), poly(isopropyl fumarate), copolymers of vinyl alcohol, aromatic polyesters and their carbonate copolymers, and related amorphous polymers.

Another suitable arrangement for the present invention is (A) Y-type bilayers, where A and B are both polymer-bound dyes, but the dipole moments of their respective dyes are pointing in opposite directions with respect to the backbone. Hence, in the Y-type arrangement, all of the dipole moments are int he same direction.

This is represented int he following scheme:

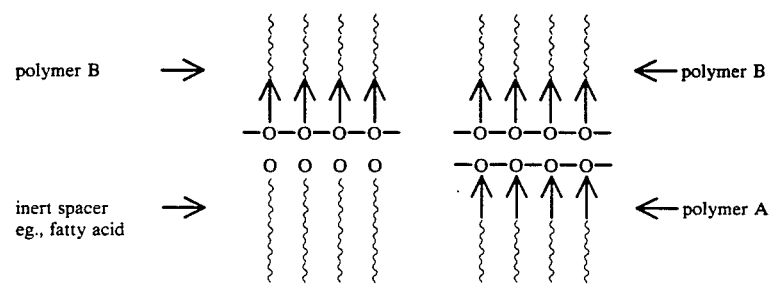

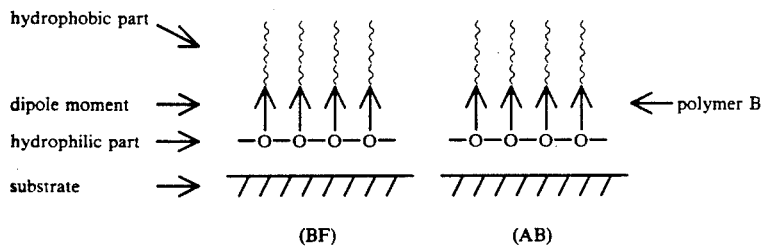

(BF)   (AB)

DESCRIPTION OF PREFERRED EMBODIMENTS

In the preferred embodiment, the side chains are attached to a preformed polymer, such as polyepichlorohydrin (PECH), poly(L-serine), poly(L-lysine) or poly(L-glutamic acid). These kinds of polymers have hydrophilic backbones and reactive side groups. PECH is commercially available from the 3M Corp., Minneapolis, Minn., and is made by cationic, ring-opening polymerization of epichlorohydrin. This technique is well known to those skilled in the art. (See the following books: "Cationic Polymerization and Related Processes", E. J. Goethals, Ed., 1984; "Ring-Opening Polymerization: Kinetics, Mechanisms and Synthesis", James E. McGrath, Ed., 1985). Other polyethers and polyamines, mentioned in these aforesaid references, can be suitable, preformed, reactive polymers for the purpose of this invention. Poly(amino acids), i.e., polypeptides, which are available from Sigma Chemical Co., from natural products, or can be synthesized, e.g., from N-carboxy anhydrides, have hydrophilic backbones and have reactive side chains. (See the following books: "Text Book of Polymer Science", Fred W. Billmeyer, 1962; and "Principles of Polymer Chemistry", Paul J. Flory, 1953).

By chemically attaching (i.e., grafting) the side chain, containing the dye and insulator groups, to the preformed polymer backbone, one can avoid side reactions which may destroy parts of the dye group, or which may terminate polymerization before the desired molecular weight is attained. The dye-containing side chains may be attached to any fraction of the backbone units by adjusting the stoichiometry of the reactants, time and temperature of the reaction. In principle, the maximum extent of reaction is sometimes limited, due to reaction conditions or stearic hinderance. However, as shown in EXAMPLE III herein, nearly 100% substitution can be attained. A specific fraction of unreacted (ungrafted) sites on the polymer backbone are often desirable, as they can act as spacer, flexibilizer or insulator groups, to allow the dye-containing side groups adequate mobility to orient on the water substrate of the LB trough. It should be noted that the stilbazolium dyes of this patent may also be attached to the monomer unit, such as chloromethyl oxetane, and then polymerized by conventional means, such as cationic initiation.

The insulator-containing side chains are grafted or copolymerized by the same techniques. The insulator side chain-precursors can be mixed with the dye side chainprecursors and grafted on simultaneously, or they may be added in any sequence. The insulator side chains may act to control the local electric fields in the proximity of the dye side chains. They may also be important to attain optimum orientation and spacing of the dye groups, which in turn influences the index of refraction and the nonlinear optical properties.

A preferred embodiment is as follows: A comb-shaped polymeric composition comprising compounds of the formula:

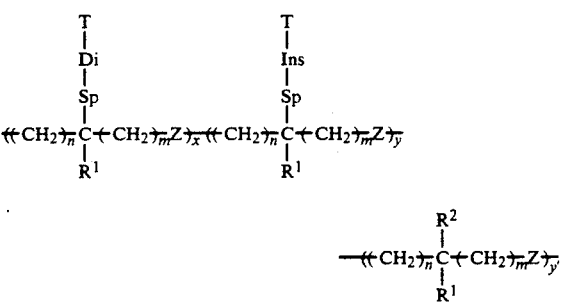

wherein n is selected from zero, one and two;
wherein m is selected from zero, one and two;
wherein (n+m) is selected from zero, one and two;
wherein (x+y+y') ranges from 4 through 4000;
wherein (x/(x+y+y')) ranges from 0.2 through 1.0;
wherein $R^1$ and $R^2$ are independently —H, and —(CH$_2$)$_i$—Q,
  wherein i is selected from one through twelve,
  wherein Q is selected from: —H, —Cl, —Br, and —OH;
wherein Z is selected from: —O—, —S—, —CONR'— and —NR'—,
  wherein R' is selected from H, and alkyl;
wherein the spacer, Sp, is: —(CH$_2$)$_i$—,
  wherein i is selected from 1 through 12;
wherein the Dye, Di, is a stilbazolium residue:

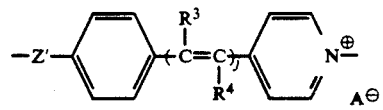

wherein $R^3$ and $R^4$ are independently H and alkyl;
wherein j is selected from 1 through 4;
wherein Z' is selected from —O—, —S—, —NR'—, —CONR'— and —CO$_2$—;
wherein R' is selected from H and alkyl;
wherein the anion, A$^\ominus$, is selected from Cl$^\ominus$, Br$^\ominus$, I$^\ominus$, R"—CO$_2$$^\ominus$, R"—SO$_3$$^\ominus$, SbF$_6$$^\ominus$, and BF$_4$$^\ominus$
wherein R" is alkyl or aryl;
  wherein either end of Di may be attached to Sp;
wherein the hydrophobic tails, T, are selected from: hydrocarbon or fluorocarbon alkyls, alkenyls, alkynyls, and alkyl diacetylenes, such as: —(CH$_2$)$_s$—CH$_3$, —(CF$_2$)$_s$—CF$_3$, and —(CH$_2$)$_k$—C≡C—C≡C—(CH$_2$)$_l$—CH$_3$ wherein s is selected from 7 through 29, k and l are selected from 1 through 18 and (k+l) is selected from 4 through 26; and wherein the insulator, Ins, is selected from:

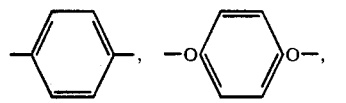

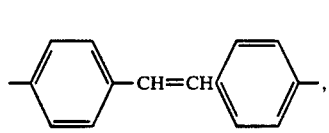

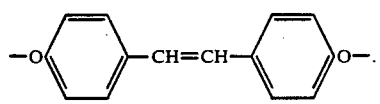

The spacer groups aid in the alignment of the dye groups. The spacer concept is well developed in the polymeric liquid crystal literature. See N. A. Plate and V. P. Shibaev, "Comb-Shaped Polymers and Liquid Crystals," Specialty Polymers Series Ed. J. M. G. Cowie, 1987 Plenum Press, New York; M. B. Biddle, et al., Colloid & Polymer Science, 266, 806-813 (1988); J. Schneider, H. Ringsdorf and J. F. Rabolt, Macromolecules, 22, 205-210 (1989). The spacer is a flexible group and allows extra degrees of freedom of movement during solvent evaporation during Langmuir-Blodgett film formation.

The insulating groups separate the dye groups so that their large electric fields arising from their large dipole moment will have less deleterious effect on each other. These local fields tend to cause the dye groups to reorganize, e.g. into H or J aggregates, to minimize the repulsion of like charges. See J. S. Schildkraut, et al., Optics Letters, 13, (2), 134-136 (1988). The concentration of dyes should be as great as great as possible in order to maximize the nonlinear optical effect. However, there is a trade off between alignment and dye concentration. There have been reports of the optical nonlinearity going through a maximum as the concentration of an inert, insulating, fatty acid is increased. (D. B. Neal, et al, Electronic Letters, V 22, 460 (1986), and L. Michael Hayden, Physical Review B, 38(6), 3718 (1988).)

The following examples describe the synthesis of polymer derivatives, precursors, and final products containing pendent stilbazolium/(or hemicyanine) dyes with long aliphatic tails, their Langmuir-Blodgett deposition, and second harmonic generating measurement sin accordance with the present invention. These examples involve substitution reactions along a preformed polymer backbone. One advantage to this approach is that interference of the dye group with polymerization of the monomer units is eliminated. However, there are cases in which the dye group will not interfere with polymerization.

EXAMPLE I

Preparation of polymer A:

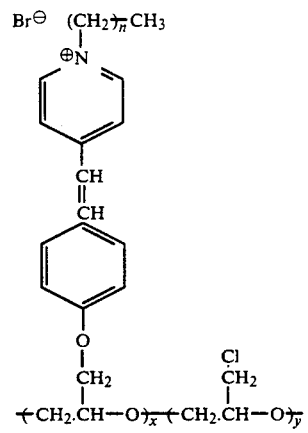

Poly(epichlorohydrin)(quantity: 0.02 moles of chloromethyl groups), having a molecular weight between 500 and 4000, and 4-hydroxybenzaldehyde (quantity: 0.04 moles) are dissolved in 110 mL dry acetonitrile. Anhydrous potassium carbonate (quantity: 0.04 moles), potassium iodide (quantity: 0.1 grams) are added to the solution and the mixture is refluxed for about 96 hours. The reaction mixture is cooled, evaporated to a thick syrup, and reprecipitated several times with methanol to yield an alkoxy-benzaldehyde-substituted polymer. Proton nuclear magnetic resonance (NMR) indicates about 47% of the backbone sites are reacted with the phenolic aldehyde.

This aldehyde-containing polymer (quantity: 0.001 moles of aldehyde unit) and N-alkylpicolinium bromide (quantity: 0.002 moles) are dissolved in 50 mL dry acetonitrile, 0.5 mL piperdine catalyst is added, and the mixture is refluxed for about 16 hours, forming a deep-red colored solution. Th reaction mixture is evaporated down to a viscous syrup and purified by precipitation, yielding a deep red-colored polymer with a glass transition temperature above 130° C. The polymer is further purified by preparative chromatography. Polymer with n=11 was prepared and called polymer A.

EXAMPLE II

Preparation of Polymer B

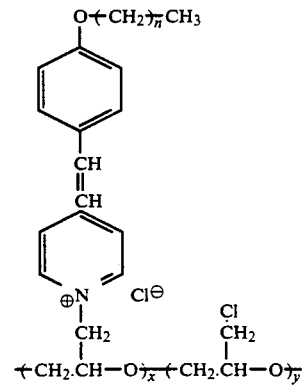

Poly(epichlorohydrin)(0.03 moles of chloromethyl groups), having a molecular weight between 500 and 4000, and 4-picoline (0.04 moles) are dissolved in 50 mL of dry acetonitrile and heated to just below reflux temperature for about 6 days, during which time the reaction mixture turns a light brown color. The reaction mixture is then cooled, evaporated to a viscous liquid, and stored under vacuum or flowing nitrogen for several weeks to further remove solvent. Proton NMR shows that about 33% of the backbone sites are reacted with 4-picoline. This poly(picolinium epichlorohydrin)(0.001 moles of picolinium groups) is dissolved in 50 mL of dry acetonitrile. Alkoxybenzaldehyde (0.002 moles), and 0.5 mL piperidine catalyst are added and the mixture is refluxed for about 16 hours, forming a red-colored solution. The reaction mixture is then cooled, evaporated down to a viscous syrup, and purified by reprecipitation from methanol to yield the hemicyanine-(or stilbazolium-) substituted polymer. Polymer with n=17 was prepared and called "Polymer B".

EXAMPLE III

Preparation of Polymer C

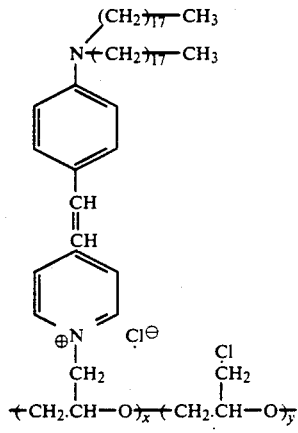

Poly(epichlorohydrin) (quantity 0.05 moles of chloromethyl groups), having a molecular weight between 500 and 4000 g/mol, was dissolved in freshly distilled 4-picoline (quantity: 0.15 to 0.50 moles). The solution was degassed by stirring under reduced pressure, purged with nitrogen gas and heated in reflux in an atmosphere of nitrogen gas. A reflux condition was maintained for 24 hours during which time poly(picolinium epichlorohydrin) precipitated from solution. The product was stripped of excess picoline under reduced pressure and dissolved in methanol (quantity: 100 mL). The methanol solution was extracted 3 times with equal volumes of cyclohexane, and the product was isolated by removal of the methanol under reduced pressure. Differential scanning calorimetry indicated that the product had a glass transition temperature of ca. 130° C. Proton and carbon-13 nuclear magnetic resonance spectroscopy indicated that 80 to 100% of the chloromethyl groups had been quaternized with 4-picoline.

Poly(picolinium epichlorohydrin) (quantity: 1.0 mmol of picolinium groups) and 4-(N,N-dioctadecyl-)aminobenzaldehyde (quantity: 1.2 mmol) were dissolved in chloroform (quantity: 20 ml). Piperidine (quantity: 1 to 5 drops) were added as a catalyst, and the solution was degassed with reduced pressure, purged with nitrogen gas and heated to reflux in an atmosphere of nitrogen gas. A reflux condition was maintained for 16 hours, and the product was isolated by removal of the solvent under reduced pressure. The product was purified by preparative gel reduced pressure. The product was purified by preparative gel permeation chromatography in chloroform, and isolated by removal of the solvent under reduced pressure. Proton and carbon-13 nuclear magnetic resonance spectroscopy indicated that 90 to 100% of the picolinium methyl groups had reacted with alkylamino-benzaldehyde to form dialkylaminostilbazolium chloride side chains on the poly(epichlorohydrin) main chain backbone.

EXAMPLE IV

The poly(picolinium epichlorohydrin) described in EXAMPLE II and III (0.001 moles picolinium unit) is dissolved in 50 mL of dry acetonitrile along with 4-N,N-dimethylaminocinnamaldehyde (0.002 moles) and 0.5 mL piperidine. The mixture is refluxed for 16 hours, forming a red-violet colored solution. The reaction mixture is cooled, evaporated to a viscous syrup, and purified by precipitation from methanol to yield the chromophore-substituted polymer:

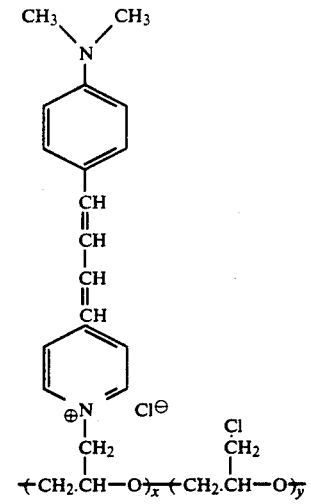

EXAMPLE V

The poly(picolinium epichlorohydrin) described above in EXAMPLE II and III, (quantity: 2.00 mmol) was dissolved in methanol (quantity: 25 ml) along with trans-Retinal (quantity: 2.20 mmol) and piperidine (quantity: 2 drops). The solution was evaporated to yield a dry solid which was purified by preparative gel permeation chromatography in chloroform, to yield the following pendent chromophore-substituted polymer:

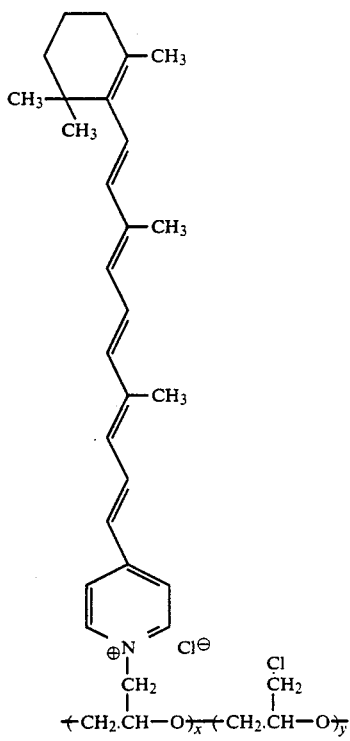

EXAMPLE VI

Preparation of a polyserine-stilbazolium dye

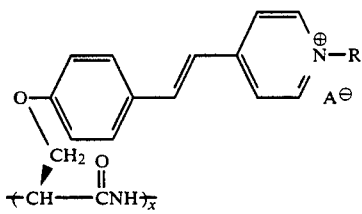

Polyserine (quantity: 0.02 moles of hydroxyl groups) and 4-hydroxybenzaldehyde (quantity: 0.04 moles), are stirred into a dry mixture of 50 mL pyridine and 50 mL dimethyl formamide with benzene sulfonyl chloride. The mixture is refluxed for about two days. The reaction mixture is cooled, evaporated to a thick syrup, and reprecipitated several times with methanol to yield the alkoxybenzaldehyde substituted polymer. This polymer (quantity: 0.001 moles of aldehyde units) and N-alkyl bromide (quantity: 0.002 moles) are dissolved in a mixture of 25 mL chloroform and 25 mL methanol, 0.5 mL piperidine catalyst is added, and the mixture is refluxed for about two days. The polymer is purified by preparative chromatography or reprecipitation.

EXAMPLE VII

Langmuir-Blodgett Film Formation

The dye-substituted polymers described above are dissolved in chloroform and spread on the water surface of a Langmuir-Blodgett trough at room temperature. The water is filtered, deionized, treated with activated carbon, and distilled in a glass apparatus. The solvent is evaporated and the film is compressed to a surface pressure between 30 and 35 dynes/cm. at a speed ranging from 0.14 to 0.34 nm/minute/chromophore at which point the organized monolayer is quite stable. A clean glass slide, which had been partially submerged in the water subphase prior to placing the film on the subphase, is pulled up through the polymer film. The amount of polymer deposited on the glass slide is measured by the decrease in area on the subphase surface (taken up by the movable dam) needed to maintain a constant surface tension at the subphase-air interface. Deposition ratios (area of the polymer removed from the trough/area of glass slide moved through the interface) range between 0.95 and 0.99 for these polymers under the conditions described. The dipping speed is about 0.60 to 0.66 cm/minute, except for the first upstroke of the glass slide, which is usually performed at about 0.3 cm/min to ensure that the substrate is well coated. The last layers can be a fatty acid, such as behenic acid, to serve as a hydrophobic, inert, sacrificial, protective overcoat.

EXAMPLE VIII

Langmuir-Blodgett hetero-multilayer depositions $(AF)_n$

The polymer from EXAMPLE I, called polymer A, and behenic acid, a 22-carbon fatty acid, were deposited on glass slides, in the "Y" mode as described in EXAMPLES V, to form alternating hetero-multilayered films, $(AF)_n$. Microscope glass slides were dipped in dilute hydrochloric acid, then dipped in distilled water to make their surface hydrophilic. The first layer, polymer A, was deposited on the upstroke, i.e., pulling a pair of glass slides from the water to the air so that one side of each glass was coated. The Langmuir-Blodgett water bath was then cleaned, behenic acid was spread on the bath and then deposited on the same glass slides on the downstroke. This sequence was continued for a total of ten layers (five polymer layers).

After deposition of each polymer layer, the second harmonic generation (SHG) was measured by shining a Nd:YAG Q-switched laser with pulse duration of 10 ns and a repetition rate of 10 Hz through the polymer film. The beam was incident to the film at 60° off normal. After filtering out the incident radiation (1064 nm), the intensity of the second harmonic (532 nm) was detected with a photomultiplier.

BRIEF DESCRIPTION OF DRAWINGS

The intensity of SHG was normalized with respect to that of the first layer and plotted as a function of the number of polymer layers. (See FIG. 1.) The SHG intensity increased quadratically with thickness.

EXAMPLE IX

Langmuir-Blodgett hetero-multilayered films $(AB)_n$

The polymer from EXAMPLE I, called polymer A, and the polymer of EXAMPLE II, called polymer B, were deposited on glass slides, in the "Y" mode as described in EXAMPLE V, to form alternating hetero multilayered films, $(AB)_n$. The same dipping protocol was used as described in EXAMPLE VIII, resulting in the dipoles in polymer A and polymer B to point in the same direction.

Figure 1:
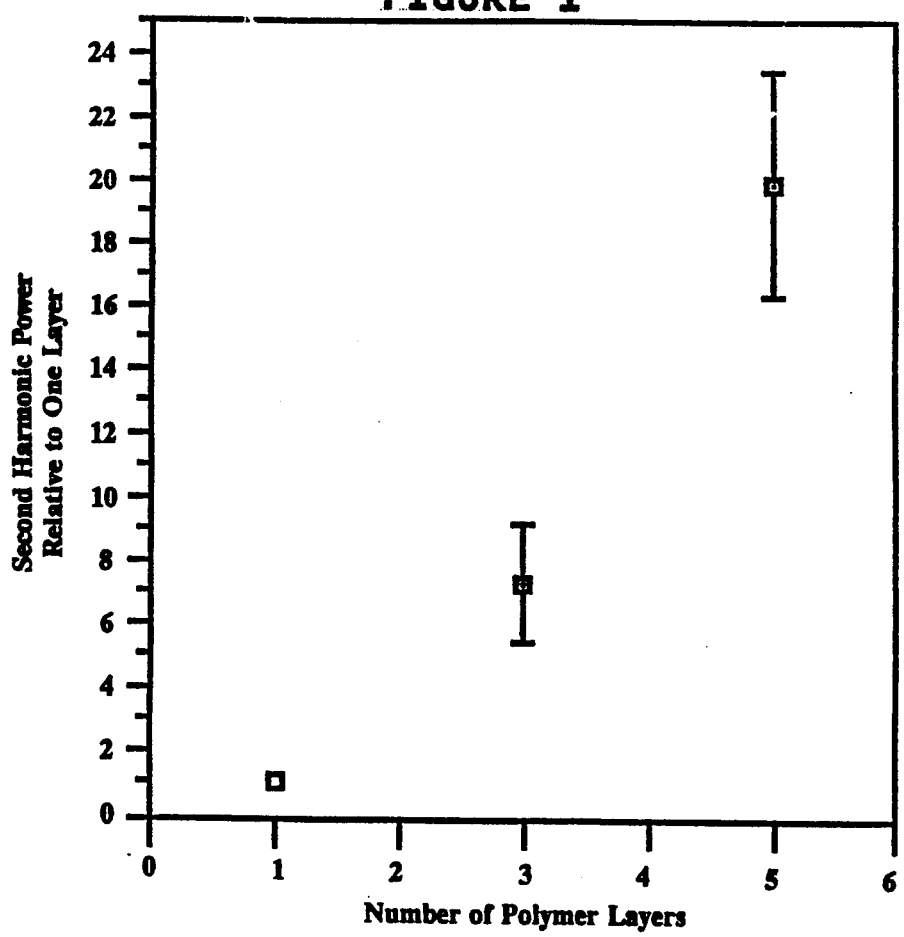
Figure 2:
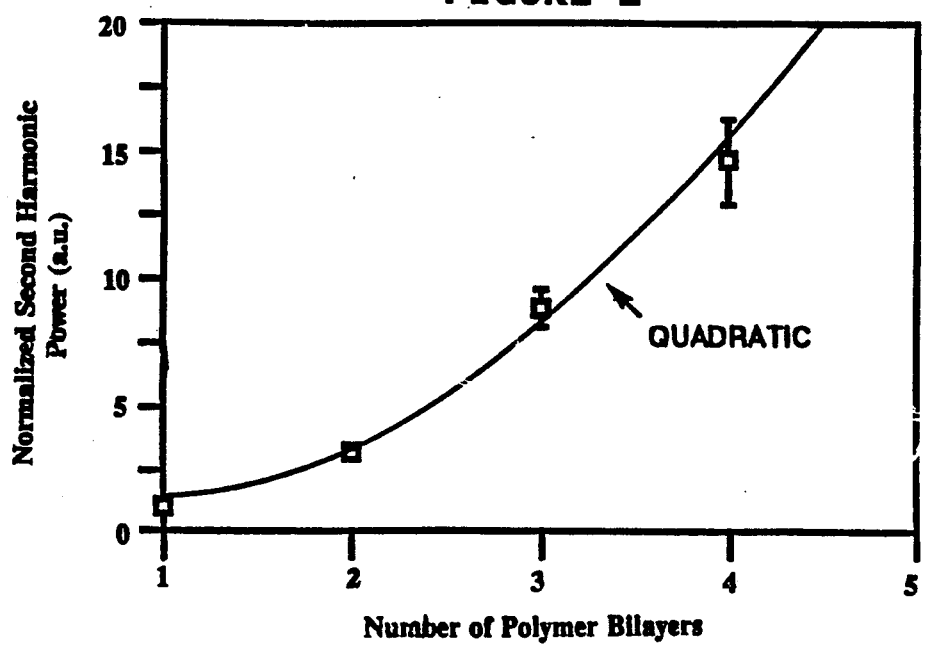

SHG was measured after each polymer layer was deposited. The intensity of SHG was normalized with respect to that of the first layer and plotted as a function of the number of polymer layers. (See FIG. 2.) The SHG intensity increased quadratically with thickness.

Having thus described our invention what we now claim is:

1. A comb-shaped polymeric composition, comprised of the following repeat units:

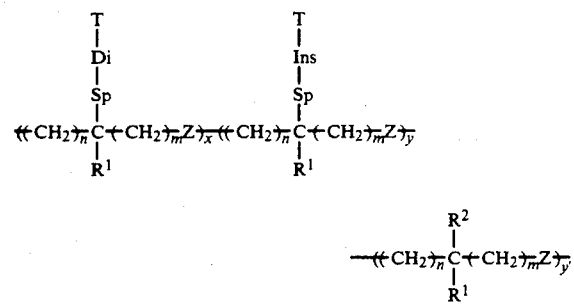

wherein n is selected from zero, one and two;
wherein m is selected from zero, one and two;
wherein (n+m) is selected from zero, one and two;
wherein (x+y+y') ranges from 4 through 4000;
wherein (x/(x+y+y')) ranges from 0.2 through 1.0;
wherein $R^1$ and $R^2$ are independently —H, and —$(CH_2)_i$—Q,
    wherein i is selected from one through twelve,
    wherein Q is selected from: —H, —Cl, —Br, and —OH;
wherein Z is selected from: —O—, —S—, —CONR'—, and —NR'—,
    wherein R' is selected from H, and alkyl;
wherein the spacer, Sp, is: —$(CH_2)_i$—,
    wherein i is selected from 1 through 12;
wherein the Dye, Di, is a stilbazolium residue:

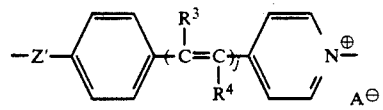

wherein $R^3$ and $R^4$ are independently H and alkyl;
wherein j is selected from 1 through 4;
wherein Z' is selected from —O—, —S—, —NR'—, —CONR'— and —$CO_2$—;
wherein R' is selected form H and alkyl;
wherein the anion, $A^\ominus$, is selected from $Cl^\ominus$, $Br^\ominus$, $I^\ominus$, $R''$—$CO_2^\ominus$, $R''$—$SO_3^\ominus$, $SbF_6^\ominus$, and $BF_4^\ominus$,
    wherein R'' is alkyl or aryl;
wherein either end of Di may be attached to Sp;
wherein the hydrophobic tails, T, are selected from hydrocarbon or fluorocarbon alkyls, alkenyls, alkynyls, and alkyl; and
wherein the insulator, Ins, is selected form:

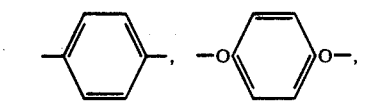

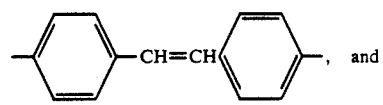, and

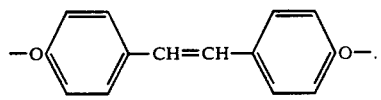

2. A polymeric composition of matter in accordance with claim 1, comprising a structure of the formula:

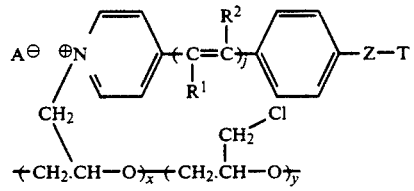

wherein Z is selected form —O—, —S—, and —NR'—,
    wherein R' is H, or alkyl;
wherein $R^1$, and $R^2$ are independently H or alkyl;
wherein T is selected form alkyl, alkenyl, and alkyl diacetylene having eight to thirty-one carbon atoms;
wherein j is selected form 1 to 3;
wherein $A^\ominus$ is selected from $Cl^\ominus$, $Br^\ominus$, $I^\ominus$, $R''$—$CO_2^\ominus$, $R''$—$SO_3^\ominus$, $SbF_6^\ominus$, and $BF_4^\ominus$,
    wherein R'' is alkyl or aryl;
wherein (x+y) is selected form 8 through 200; and
wherein (x/(x+y)) is selected from 0.20 to 1.0.

3. A polymeric composition of matter in accordance with claim 1, comprising a structure of the formula:

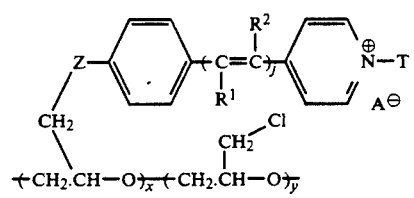

wherein Z is selected from —O—, —S—, and —NR'—,
    wherein R' is H, or alkyl;
wherein $R^1$ and $R^2$ are independently H or alkyl;
wherein T is selected from alkyl, alkenyl, and alkyl diacetylene having eight to thirty-one carbon atoms;
wherein j is selected form one to three;
wherein $A^\ominus$ is selected from $Cl^\ominus$, $Br^\ominus$, $I^\ominus$, $R''$—$CO_2^\ominus$, $R''$—$SO_3^\ominus$, $SbF_6^\ominus$, and $BF_4^\ominus$,
    wherein R'' is alkyl or aryl;
wherein (x+y) is selected from 8 through 200; and
wherein (x/(x+y)) is selected from 0.20 to 1.0.

4. A polymeric composition of matter in accordance with claim 1, comprising the structure of the formula:

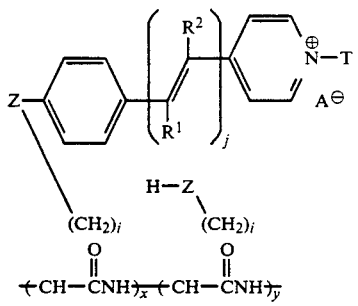

wherein (x+y) is selected from 4 through 4000, and x/(x+y) is 0.2 to 1.0;

wherein i is selected from one through four;

wherein Z is selected from —O—, —S—, and —NR'—, wherein R' is H, or alkyl;

wherein $R^1$ and $R^2$ are independently H, alkyl or aryl;

wherein T is selected from alkyl, alkenyl, and alkyl diacetylene having eight to thirty-one carbon atoms;

wherein j is selected from one to three; and, wherein $A^\ominus$ is selected from $Cl^\ominus$, $Br^\ominus$, $I^\ominus$, $R''-CO_2^\ominus$, $R''-SO_3^\ominus$, $SbF_6^\ominus$, and $BF_4^\ominus$, wherein R" is alkyl or aryl.

5. A polymer in accordance with claim 2, wherein the backbone and spacer group combinations are comprised of polyepihalohydrin, and the dye-containing pendent groups are derived from the picolinium salt of polyepihalohydrin and 4-picoline, and the subsequent reaction product of said picolinium salt with the aldehyde of an unsaturated, electron-donating, molecule.

6. A polymer in accordance with claim 5, wherein the pendent dye groups are derived from the reaction of the picolinium salt of polyepihalohydrin and trans-retinal, wherein the resulting ratio of remaining halomethyl groups to pendent trans-retinyl-picolinium salt groups may range from zero to 0.8.

* * * * *